United States Patent [19]
Franchi et al.

[11] 4,079,206
[45] Mar. 14, 1978

[54] SWITCHING ARRANGEMENT FOR A TELEPHONE SYSTEM FOR CONNECTING A CALLING SUBSCRIBER SET TO AN IDLE CONNECTOR SET UPON RECOGNIZING A LOOP IN THE CONNECTOR SET

[75] Inventors: Bruno Franchi; Christian Kofler, both of Munich, Germany

[73] Assignee: Siemens Aktiengeseilschaft, Munich, Germany

[21] Appl. No.: 692,992

[22] Filed: Jun. 4, 1976

Related U.S. Application Data

[63] Continuation of Ser. No. 498,194, Aug. 16, 1974, abandoned.

[30] Foreign Application Priority Data

| Aug. 22, 1973 | Germany | 2342417 |
| Aug. 22, 1973 | Germany | 2342429 |
| Aug. 22, 1973 | Germany | 2342410 |
| Aug. 22, 1973 | Germany | 2342375 |

[51] Int. Cl.² .......................................... H04Q 3/52
[52] U.S. Cl. ........................... 179/18 FG; 179/18 GF

[58] Field of Search ........ 179/18 FG, 18 GF, 18 FA, 179/18 FF, 18 ES, 27 D

[56] References Cited

U.S. PATENT DOCUMENTS

| 3,489,856 | 1/1970 | Brightman | 179/18 GF |
| 3,491,209 | 1/1970 | Relsted | 179/18 GF |
| 3,601,547 | 8/1971 | Potter | 179/18 GF |
| 3,760,361 | 9/1973 | Leger et al. | 340/166 R |
| 3,781,484 | 12/1973 | Macrander | 179/18 GF |
| 3,828,314 | 8/1974 | Bradbery et al. | 340/166 R |

*Primary Examiner*—Thomas W. Brown
*Attorney, Agent, or Firm*—Schuyler, Birch, Swindler, McKie & Beckett

[57] ABSTRACT

A switching arrangement for a telephone system, wherein a subscriber circuit is connected over crosspoints of corresponding switching matrix stages to a junctor circuit feeding said subscriber circuit and receiving the signals thereof, wherein a common link-selecting and marking unit controls the switching of transmission paths as required by a common central control unit, and wherein a subscriber and junctor busy/free marking store marks an available junctor circuit.

20 Claims, 4 Drawing Figures

SWITCHING ARRANGEMENT FOR A TELEPHONE SYSTEM FOR CONNECTING A CALLING SUBSCRIBER SET TO AN IDLE CONNECTOR SET UPON RECOGNIZING A LOOP IN THE CONNECTOR SET

This is a continuation of application Ser. No.498,194, filed Aug. 16, 1974, abandoned.

BACKGROUND OF THE INVENTION

As a rule, in conventional common-control telephone systems with scanning of the loop conditions of the subscriber circuits centralized scanning means periodically checks all subscriber circuits and, if necessary, also junctors consecutively one after the other for comparing their momentary statements with the previous statement so as to determine any possible changes in the subscriber circuit or junctor statement and to initiate appropriate new switching processes. In these known scanning processes, particularly for the purpose of determining if a subscriber set wishes to establish an outgoing connection, previous connection of a subscriber circuit to the junctor circuit is not necessary. Therefore that is also assumed that the loop is buffered in a subscriber line circuit and it also implies the use of at least one or two relays or indicators for each subscriber line circuit.

When using electronic crosspoints, e.g. transistors, thyristors, etc., as crosspoints, special measures would have to be taken for the automatic ring disconnection, if subscriber line circuits are employed for recognizing and storing of the loop statements, since no direct-current loop supervision can occur over such switching elements. The ring disconnection in prior art systems is supervised and controlled from the subscriber line circuit, which of course, results in a greater outlay for each subscriber line circuit.

SUMMARY OF THE INVENTION

It is an object of the present invention to use rapidly controllable crosspoints in a telephone system, wherein the amount and complexity of decentralized equipment, particularly the amount of apparatus allocated to individual subscribers, is considerably reduced without substantially impairing the general system configuration.

In accordance with the invention, the foregoing and other objects are achieved by providing a central device controlling a progressive cycle of connecting and releasing of connections between an existing speech path and all free subscribers one after another to an available junctor circuit which is not yet connected over crosspoints. This connection is only maintained when the subscriber at that moment closes the line loop. Switching elements are provided to maintain and continue the aforesaid cycle by providing the next free junctor circuit for a progressive connection with the subscriber circuits.

In this way, it is possible to reduce expenditures for subscriber line circuits due to the associated calling relay and subscriber or twin relay conventionally needed for each subscriber set in the telephone exchange. High-speed crosspoints are essential for such systems. For example, triacs (two-way thyristors) may conveniently be employed as crosspoints. The use of such crosspoints has the advantage that the automatic ring connecting and disconnecting can likewise be effected from the junctor circuit because direct-current loop supervision over such triacs is possible. Since the electronic crosspoints are high-speed switching elements and the progressive switching is effected with the central control unit, no great delay arises in the system with respect to the processing of the call requests under consideration. Furthermore, routine maintenance supervision of the crosspoints switching can be combined with the progressive cycle of connecting and releasing of connections between subscribers and a free junctor without requiring a substantial amount of additional apparatus.

In a further development of the invention, in order to be able to connect through the crosspoints switched into the speech path, even if it does not involve the switching of the first speech path, at any time, without considerably more outlay, triacs are provided as crosspoints for the gradually occurring through-connection of calls. These are controlled from the centralized unit over appropriate adtivating crosspoints allocated to the speech-path crosspoints over parallel switching stages, in accordance with the path established. These activating crosspoints are disposed along a pilot wire (i.e., an auxiliary conductor used for control, interlocking and protective purposes) corresponding to the completed connecting paths; they can be made conductive both at the onset of the call setup and also at every zero-crossing of an a-c signal applied to the speech path.

In this way, the crosspoints of the speech paths can continue to be controlled over the control crosspoints as long as there is a possibility that the speech-path crosspoints might be disconnected temporarily. Each time the speech-path crosspoint becomes accidentally inoperative, the control crosspoint in the pilot wire ensures the immediate renewal of the connection. As a result, centralization of the connection and disconnection of ringing in the connector set is possible.

According to a further development of the invention, triacs (two-way thyristors) are provided as crosspoints for the network switching, which are each connected in parallel over the control crosspoints included in the pilot wire. In this case, a separate controlling crosspoint is provided to supervise each pair of speech-path crosspoints and to monitor the through-connection thereof.

In this way, direct coupling of the pilot wire with the speech wire is avoided in a simple manner. As a result, the pilot wire can continue to be through-connected during the existing connection. A result is that the pilot wire is held by the common control unit even when connections are transferred, so that in this case additional storage means for the addresses of the subscriber circuits and the used trunk line repeater participating in the original call need not be provided. As a result, by disconnecting the holding circuit of the speech path crosspoints independently thereof, the crosspoints of the pilot wire are held for storing the subscriber circuits originally participating in the call so as to enable cancellation of the original call connection or acceptance thereof by transferring.

According to a further development of the invention, in order to reduce the amount of apparatus in the common control unit required for link selection and crosspoint switching, a marking circuit is provided for the idle subscriber circuit by an individual subscriber marking point by utilizing what is known as the "rate effect". By this "rate effect" is only one pilot-wire over crosspoint multiples between the subscriber circuit and the marked junctor circuit or the marked trunk line circuit is through-connected, so that the control and switching elements provided in said pilot wire also through-connect the allocated speech-path crosspoints.

In this way, a connection is established to a marked junctor circuit or to a marked trunk line circuit in a simple way through only the use of the "rate effect" as a function of the idle/busy test for one idle subscriber circuit only. Thus, one not only economizes on the amount of apparatus required for the link selection, but also the through-connection of the speech-path crosspoints can be controlled over the pilot wire, when the subscriber circuit is in an idle. A separate busy/free marking store for marking busy subscriber circuits is not necessary. Changes in the statement of the subscriber loop can be determined for the subscriber circuit tested "idle" both in the subscriber line circuit and in the junctor circuit or in the trunk line circuit.

BRIEF DESCRIPTION OF THE DRAWINGS

The principles of the invention will be more readily understood by reference to the description of a preferred embodiment given hereinbelow in conjunction with the 4-figure drawing which is a schematic diagram of a switching arrangement constructed according to the invention wherein.

DESCRIPTION OF PREFERRED EMBODIMENTS

Figure 1:
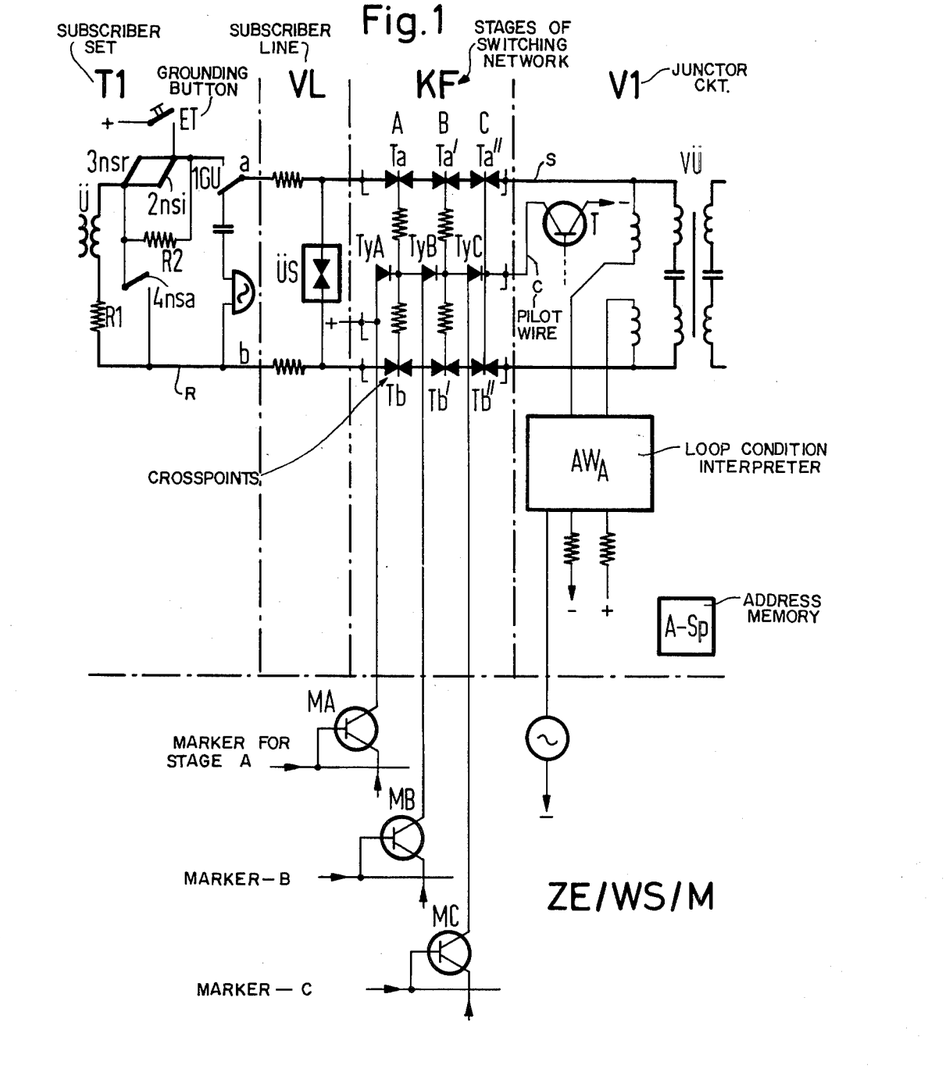
FIG. 1 shows a private branch exchange having a switching network with crosspoints consisting of triacs (two-way thyristors and with a common control equipment ZE/WS/M).

In the private branch exchange of FIG. 1, the subscriber set T1 is connected over the subscriber line VL and the switching matrix stages A, B, C of the switching network KF, e.g., with the junctor circuit V1. The switching network shown consists of triacs (two-way thyristors) having the capability of letting through direct current as well as alternating current; but at every zero-crossing of the alternating current the traics are opened. In order to be able to close the triacs again after every disconnection, the supplementary S-wire is coupled with the crosspoints over the allocated thyristors. A continuous crosspoint control circuit is to exist over this S-wire, at least up until the through connection of the speech-path such that the triacs are immediately reactivated after releasing by each zero-crossing of the alternating current, e.g., of the ringing current.

When the subscriber circuit is idle, the switchhook 1GU is in the released condition and there is no loop to the junctor circuit. Now, when the subscriber lifts the hook of subscriber station T1, the switchhook contact 1GU is activated and the normal loop with the well-known resistance exists over the parallel-connected contacts 2nsi and 3nsr. This loop, in the case of conventional systems, is recognized in the subscriber line circuit whereby as a result the through connection to the junctor circuit is marked either by putting into operation directly controlled selectors, by causing link selection through identification or by scanning, with subsequent identification and marking.

The present embodiment is based on an entirely new principle. The addresses of the subscriber circuits for which a connection already exists in the incoming or outgoing direction are stored at a central point AT (FIG. 3).

Figure 3:
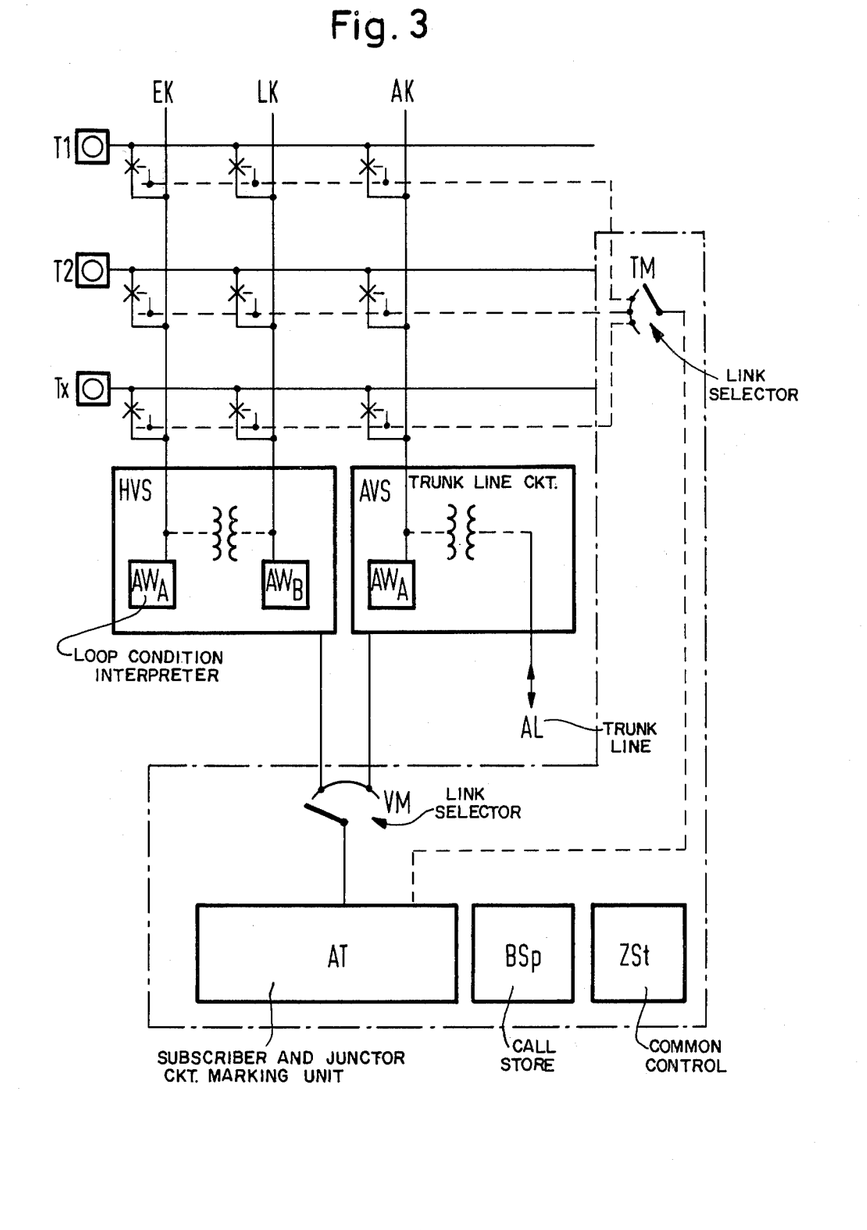
FIG. 3 shows a diagram for the incorporation of the preferred embodiment of FIGS. 1 and 2 in a private branch exchange.

Proceeding from this assumption, a through-connection to an allocated junctor circuit marked as idle is caused by the common control ZE/WS/M periodically for all the subscriber sets not yet marked in the subscribers and junctors busy/free marking store mentioned above and by the subscribers and junctor circuits free marking unit including junctor circuit marker VM (FIG. 3) and subscriber set marker TM (FIG. 3). This cyclic connection of all the subscriber sets to the idle and allocated junctor circuit lasts until a subscriber set supplying an originating request for the establishment of a connection in the outgoing direction is connected to a junctor circuit. This request is recognized by the loop-condition interpreter $AW_A$ of the connected junctor circit. The interpreter $AW_A$ is allocated to the A-side of the junctor circuit. If this subscriber set is definitively connected to the allocated junctor circuit, that is, if the junctor circuit is presently also centrally marked as busy, a new idle junctor circuit is made available and connected progressively during the cycle to the subscriber sets not yet marked busy in storage AT. When all the junctor circuits are busy, either a trunk line circuit or an auxiliary line junctor is allocated and used in a manner in itself known.

In this way, the need for a subscriber line circuit is obviated. For example, when the user of the subscriber set T1 lifts the hand set and has established the loop over the hook contact 1GU in the manner described above, he is connected by the common control unit to the junctor circuit V1 during the above-mentioned switching cycle over an appropriately set path via the switching matrix stages A, B and C of the switching network KF with crosspoints Ta/Tb, Ta'/Tb', Ta''/Tb'' and with control crosspoints $T_yA$, $T_yB$, $T_yC$ in FIG. 1 and with crosspoints $TA_a/TA_b$, $TB_a/TB_b$, $TC_a/TC_b$ and control crosspoints $LD_A$, $LD_B$, $LD_C$ in FIG. 2 and with crosspoints $T_{a1}/T_{b1}$, $T_{a2}/T_{b2}/T_{b3}$ and control crosspoints $LD_1$, $LD_2$, $LD_3$ in FIG. 4, and is recognized as the calling party. Presently, the closed loop of the subscriber set T1 is ascertained by the switching elements of the interpreter $AW_A$ supervising the loop condition of the subscriber sets and allocated to the junctor circuit on the A-side (calling sides). Since a scanning cycle is run for said subscriber (and junctor busy/free marking store, that is to say, no connection to another subscriber junctor or trunk line circuit exists, the established connection to the free junctor circuit remains in existence. The dial pulse tone signal is transmitted as a result of the marking of said condition.

The triacs of the switching network KF over which the path is through-connected are held closed by the C-wire at the zero-crossing of the alternating current of the dial tone.

The dial pulses presently provided by the subscriber and junctor busy/free marking store are transmitted through appropriate resistance tuning of the resistor R2 introduced into the loop by opening the contacts 2nsi and 3nsr with the resistances of the resistor R1 and of the transmitter U so producing current-reducing signals which, for example, produce half the current in the interpreting means of the junctor circuit. This current reduction does not lead to a releasing of the triacs switched in the speech path. Upon receipt of the first signal, the dial pulse is switched off in the junctor circuit in a manner in itself known. The dial pulses received from the receiving means are interpreted thereat or centrally, and lead to the through connecting of the communication path by the common control unit in a manner well known. Once this path has been set, the interpreter $AW_B$ in the junctor circuit which is allocated to the B-side (called side), checks the loop condition of the called subscriber set called to which connection is desired. If the loop is open, the automatic ring signal connection takes place. If the loop is closed and the subscriber, therefore, is busy, there is no automatic ring connection; the interpreter $AW_B$ discovers that the loop is closed. However, the B-ring through connection may likewise not be forthcoming from the start because of "busy" mark in the call store; a busy signal transmission can occur on the calling A-side.

If during the existing connection the grounding button is actuated, then the resulting signal is detected in the interpreter $AW_A$ allocated to the calling A-side of the subscriber and junctor busy/free marking store A, because one of the speech wires is shorted. When the receiver is in on-hook condition, the current value again equals zero and this, too, is interpreted by the interpreting means of the connector set and leads to the release of the crosspoints in the subscriber and junctor busy/-free marking store and other devices linked by the connection.

It follows from the above that signals are transmitted from the subscriber set T1 at full current, and half current, zero current values. This means that no distinction must be made between the current of the dial signal and the current of the release signal. In this way supervision of the pulse length is obviated.

It also follows from the above that the automatic signalling, as well as the automatic connection and disconnection of ringing tone signals occurs in the junctor circuit, the latter taking place when calls come in the incoming direction. This is possible, because the triacs operate as two-way thyristors and, hence, let the current pass in both directions. However triacs are normally switched off at each zero-crossing of the alternating current. However, to ensure that the triacs of the through-connected speech paths again switch through immediately after each zero-crossing of the alternating current, the C-wire is provided with the pilot-wire crosspoints allocated to the speech-wire crosspoints consisting of thyristors through-connected over the transistor T, at least until the called subscriber set answers by lifting the hand set.

It should also be mentioned that as regards the accessing of the crosspoints to be through-connected on account of the link selection, these crosspoints must in any event be accessed both during the above-mentioned cycle and in the case of selective accessing for an incoming call. This accessing occurs over the thyristors described above and disposed in the above-mentioned pilot C-wire. In this way, the control circuits of the control cross-points are in the C-wire multiple utilized. Also present in said C-wire is a switching element, e.g., the transistor T, (FIG. 4) which must be released after pickup of the hand set of the called subs riber. The C-wire thus ensures that from the moment of controlling at least until the called subscriber answers, the through-connection of the transistor allocated to the junctor circuit and the communication path and the through-connection of the triacs is maintained irrespective of whether the triacs are switched off briefly or not through AC signals. The alternating speed current does not affect the holding and releasing of the triacs, because it is superimposed on the triac's hold current.

Triacs further have the advantage that they are fail-safe, because these elements cannot be destroyed until a comparatively high voltage is reached, e.g., in excess of 400 volts, that's more than six times the operating voltage. However, it must be assumed that each subscriber set is provided with an overvoltage protection. So, the system is substantially disturbance-free.

In the case of an incoming call the through connection of the communication path is switched by marking the called subscriber. Thus, in this case the accessing of the called subscriber occurs selectively and the automatic ring disconnection occurs as a function of the elements recognizing the loop on the B-side interpreter $AW_B$ of the junctor circuit.

The transistor T mentioned hereinabove as disposed in the junctor circuit in the C-wire is released after the called subscriber answers and/or after the call in the outgoing direction is established, that is to say, after the point of time at which the AC signals are reliably switched off from the speech wires so as to reduce the danger of crosstalk by indirectly coupling. If an AC signal must be cut in during an existing call, the C-wire must again be switched through both to the calling subscriber set and to the called subscriber set. This can be done without additional outlay, because the path involved, as well as the subscriber sets concerned, are still known, since the speech wires are still through-connected.

If the grounding button is actuated during an existing call, it will be necessary, for example, to transfer to another junctor circuit for establishing an internal call-back connection.

In the case of a grounding button operation, the relevant subscriber set T1 is connected, for example, to a trunk line circuit over the switching network KF.

The grounding button operation is ascertained in the interpreter $AW_A$ on the A-side, because one of the speech wires, e.g., the R-wire is de-energized as is known. As a result, the triacs in this wire become inoperative. In order to immediately cut them in again, the S-wire must again be through-connected. Therefore, an address memory AS$p$ for receiving the address of subscriber A is allocated to the junctor circuit, for example, of the trunk line circuit AVS, (FIG. 3).

The crosspoints of the wire and, thereby, the crosspoints in the relevant speech wire mentioned above can now be accessed again and through-connected. After releasing the grounding button and again through-connecting the speech wire, the S-wire can again be released.

As a result of the grounding button operation referenced above, if the reconnection does not occur via a separating two-way switch in the trunk line circuit, the original communication path will be released from the trunk line circuit, and reconnection to an internal junctor circuit for establishing an internal callback connection will be initiated from the common control unit, as is known. The reconnection of the communication path is effected by accessing the crosspoints of the wire and thereby establishing the corresponding selection on the basis of the stored subscriber and repeater addresses.

The original path continues to be held in storage in conjunction with the subscriber and trunk line circuit address. In this way, the subscriber set originating the connection, or the queried subscriber set can be connected to the originally seized trunk line circuit and, thereby, to the trunk line subscriber, through appropriate known measures.

If the transfer to the call-back circuit occurs in the trunk line circuit itself, then during the consulting call back call the path to the trunk line circuit can continue to exist up to the trunk line circuit.

Both by reconnecting the waiting trunk line to the subscriber A and by the transfer of the trunk line call to the called back subscriber as a function of a grounding button by the subscriber B, one of the speech wires mentioned above is interrupted. As described above with reference to the initiation of the callback call, the interrupted speech wire is controlled by the S-wire and is thereby reconnected again. The corresponding crosspoints therein are reversed and through-connected. To reconnect the pilot wire on the A-side, the above-mentioned address memory AS$p$ is provided for receiving the address of the calling of subscriber A. This address is needed to reconnect the pilot wire on the A-side. The address memory BS$p$ is provided for the receiving of the address of the called back subscriber B; this address is needed to reconnect the pilot wire on the B-side. After renewed accessing of the crosspoints of the speech wire de-energized by the grounding button pressure, the pilot wire is released again.

Thus, in the system described with reference to FIG. 1, the automatic connection and disconnection of the ring tone can be effected in the centralized junctor circuit instead of in the subscriber circuit, through the use of the triacs. This centralizing is not possible when thyristors are employed, because in that case the connection and disconnection of the ring tone for each individual subscriber must occur from the subscriber line circuit; then also the entire subscriber line circuit and the resistive decoupling therein for cutting the direct current off from the thyristor crosspoints can be dispensed with.

As mentioned hereinabove, this is accomplished in that in the above-described system the subscriber sets are connected cyclically to an allocated junctor circuit marked "idle" and tested for its loop condition, such that this occurs only for the subscriber sets marked "idle" in a subscriber and junctor busy/free marking store. This subscriber and junctor busy/free marking store is so constructed that either during the "busy" marking process the address for marking said "busy" condition is stored or, which is more expedient, a "busy" mark is written into subscriber addresses already present in a given sequence, which mark is erased again upon release of the connection. This cyclic through-connection of an allocated junctor circuit with unseized subscriber sets affords a simple possibility for concurrently taking advantage of a progressive through-connection test and, thereby, of the performance test of the link selector, the crosspoints and the paths. To this end, it is considered good policy to carry out the progressive switching of connections between a marked connector set and the idle subscriber sets according to a system adapted to the performance test in order to examine thoroughly, through deliberate control, all the connection possibilities, crosspoints and paths.

If instead of the triacs utilized in FIG. 1 one uses for the circuit described with reference to the preferred embodiment of FIG. 2 the newly developed opto-triacs, that is to say, if triacs in the speech wires that are accessed are switched by light-emitting diodes switched in the S-wire, this will result in the advantage that during the existence of a connection the S-wire need not be interrupted to prevent direct coupling, since said light-emitting diodes have no direct-coupling properties.

This also means that the existing communication path continues to be stored over the S-wire; and further, in contradistinction to the preferred embodiment of FIG. 1, address memories for receiving the address of subscriber A and that of subscriber B in the junctor circuits and trunk line circuits in which a grounding button signal is received and interpreted, can be dispensed with (AS$p$ and BS$p$).

Figure 2:
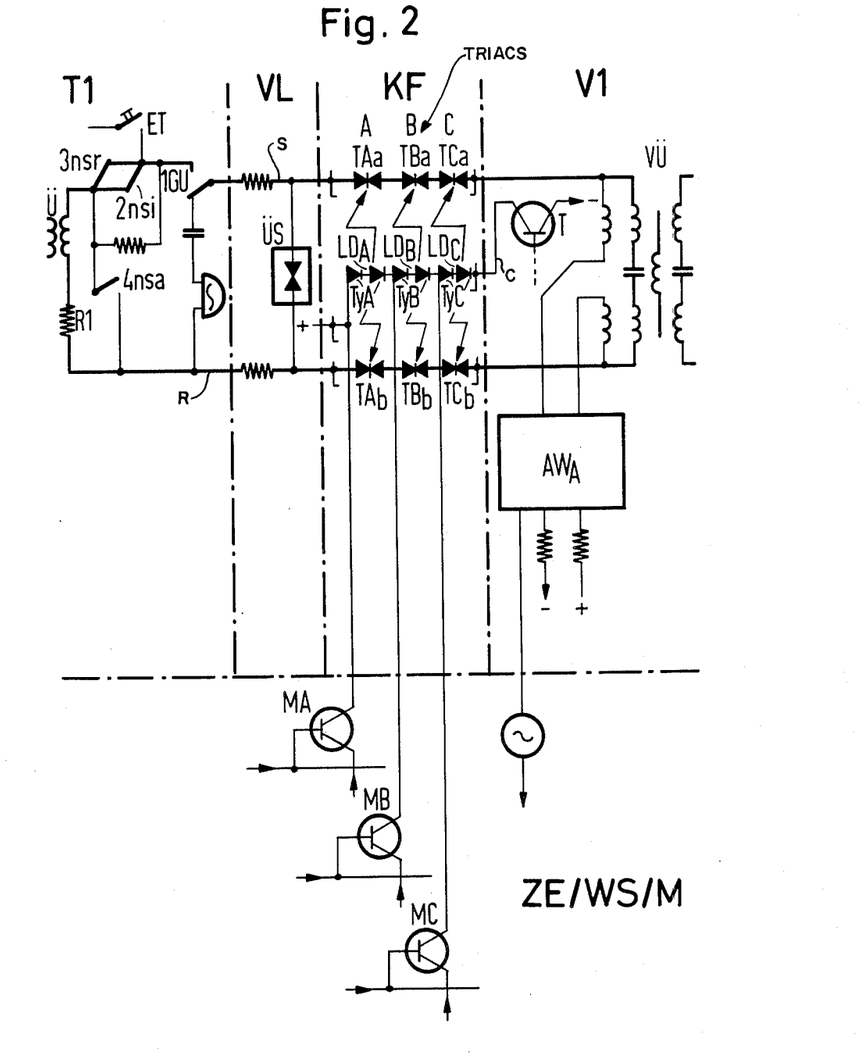
FIG. 2 shows a private branch exchange having a switching network with crosspoints consisting of optotriacs. The modules used in this case and called optotriacs consist of two triacs (two-way thyristors) controlled by a light-emitting diode, the triacs being disposed in the speech wires and the light-emitting diode in the pilot wire.

In the preferred embodiment of FIG. 2, the accessing of the pilot-wire crosspoints, thyristors allocated to the speech-wire crosspoints, triacs, and thereby also the light-emitting diodes, again occurs over the common control equipment and the link selector. As in the preferred embodiment of FIG. 1, here, too, the cyclic through-connection between a junctor circuit marked "idle" and any idle subscriber must be carried out by a common scanning device fixing a given sequence of the through-connection and testing in advance of the busy/idle status. The subsequent processes correspond to operations that have already been described with reference to FIG. 1.

It is apparent from the diagram of FIG. 3 that the scanning device referenced above comprises a junctor circuit and a trunk line circuit repeater marker VM and a subscriber marker TM, wherein the junctor circuit and trunk line circuit marker is constantly set to the next idle junctor circuit and the subscriber marker accesses progressively, one after the other, the idle subscribers. This accessing, as mentioned hereinabove, is a function of the seizure identification of the subscribers, which is held in the subscriber and junctor busy/free marking store BS$p$. This seizure identification occurs, for example, by writing a seizure bit into the relevant subscriber address. If the common control equipment is seized for another process, this scanning process can nevertheless be continued independently thereof. Only if a path setting process is carried out from the common control equipment, must the cyclic scanning process of the subscribers be interrupted. This is caused by the common control equipment through an appropriate instruction to the scanning device AT. FIG. 3 shows both the accessing of the internal connector sets HVS and the accessing of the trunk line circuits AVS during their activity as an auxiliary set during the "busy" period of all the junctor circuits.

Figure 4:
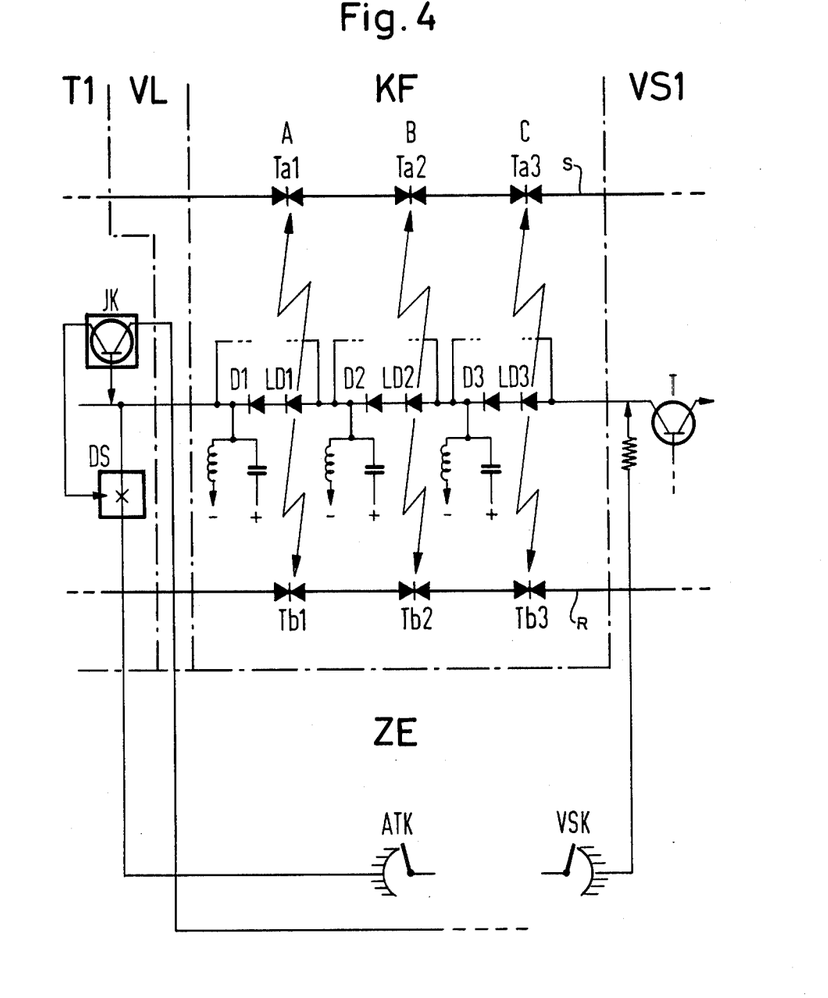
FIG. 4 shows the use of the rate effect in the example of FIG. 2.

FIG. 4 is related to the preferred embodiment of FIG. 2 and shows another type of communication-path network without link selection in accordance with the "rate effect."

An article by the International Telephone and Telegraph Corporation published in "Telephony" (Dec. 6, 1971) describes the use of the "rate effect" mentioned above with reference to various preferred embodiments for the switching of a speech path over PNPN diodes. This description relates that among the great number of possible communication paths, one path presents itself automatically as the preferred path on account of the properties of said PNPN diodes and of the different time-related switching, if the starting and termination points of the connection to be switched are marked. The arrangement described in the above article is a single-wire speech-path network.

In the arrangement of FIG. 4, the marking of the S-wire at the starting and termination point is carried out by marking, e.g., the junctor circuit VS1 over the scanner VSK and the marking of a subscriber over the scanner ATK. With the marking of a subscriber set, the potential across the S-wire is first ascertained over an appropriate indicator IK of the subscriber set; only in the case of a potential that marks the idle condition is the marking potential connected to the S-wire over the switch D of the through-connecting equipment DS. Thus, through the use of the "rate effect," known in itself, only one pilot-wire switching to the marked junctor circuit or trunk line circuit is realized over crosspoint multiples branching out into each crosspoint stage.

After switching through one of the possible connections between the junctor circuit and the subscriber set over the corresponding PNPN diodes D1, D2 and D3 the triacs T$a$1, T$b$1 and T$a$2, T$b$2 and also T$a$3 and T$b$3 are also switched through over the light-emitting diodes LD1, LD2, and LD3. After this through-connection, the S-wire remains switched for the duration of the connection, and the processes operate in accordance with the processes described with reference to FIGS. 1 and 2.

A special address memory A and a special address memory B are not needed either in the case of the above preferred embodiment for storing away corresponding subscriber addresses and the renewed accessing of the R-wire in the case of a grounding button operation.

In the system of FIG. 4, only one additional indicator is needed per subscriber to eliminate the link selector and the subscriber and junctor busy/free marking store as well as the amount of apparatus required for continually correcting the contents of the latter with a view to marking only the busy subscriber sets. Since the switching of communication paths is faster, only a little time is needed to run a scanning cycle of the subscriber sets. In addition to the link selection, the individual accessing of the crosspoints to be through-connected per switching matrix stage is likewise dispensed with. Opto-triacs may be employed for through-connecting the speech-path crosspoints. The connector set is constructed in the same manner as those in the preferred embodiments of FIGS. 1 and 2.

This disclosure is directed only to exemplary embodiments of the described invention, whose true scope is to be defined only by the appended claims.

We claim:

1. A telephone system switching arrangement comprising
   a plurality of subscriber sets,
   a plurality of subscriber lines connected to the subscriber sets,
   a plurality of junctor circuits,
   a switching network for establishing connections between the subscriber sets and the junctor circuits,
   a loop condition interpretor means for checking the status of subscriber sets,
   a subscriber set and junctor circuit busy/free marking store for storing the status of subscriber sets and junctor circuits,
   a marker for the subscriber sets and a marker for a free one of the junctor circuits for link selecting and connection establishing in the switching network, and
   a subscriber scanning unit responsive to information in the busy/free marking store for establishing connections between the free junctor circuit and the subscriber sets over the switching network for transmitting the subscriber set status to the junctor circuit and the marking store before through-connecting the speech path for connecting calling and called subscribers.

2. An arrangement as claimed in claim 1 wherein said subscriber scanning unit is responsive to the information in said marking store to scan only free sets of said plurality of subscriber sets.

3. An arrangement as claimed in claim 2 wherein a speech path connection between the subscriber set and the junctor circuit is established if a previously actuated grounding button of a subscriber set is released while the junctor circuit is connected to the subscriber set.

4. An arrangement as claimed in claim 3 wherein the marking store includes means for identifying a free junctor circuit after establishment of the speech path connection, the scanning means being responsive to said identification to resume scanning the free subscriber sets.

5. An arrangement as claimed in claim 4 wherein the switching network includes
   speech path crosspoints and control crosspoints along a pilot wire,
   the markers being connected to the control crosspoints of the pilot wire,
   the control crosspoints controlling the speech path crosspoints to establish a connection between the free junctor circuit and the scanned subscriber sets.

6. An arrangement as claimed in claim 5 wherein the control crosspoints are LED's and the speech path crosspoints are opto-triacs.

7. An arrangement as claimed in claim 6 including means for carrying out a link selection for establishing crosspoint connections using the pilot wire as by a rate effect.

8. An arrangement as claimed in claim 7 wherein the marking store includes means for identifying a free junctor circuit after establishment of the speech path connection, the scanning means being responsive to said identification to resume scanning the free subscriber set.

9. An arrangement as claimed in claim 8 including a second busy/free marking store for storing addresses of called subscriber sets, whereby transfer functions involving said calling and called subscribers may be accomplished.

10. A circuit arrangement for a telephone system for establishing connection paths between calling and receiving subscriber sets over speech path crosspoints of a switching matrix, each of said established connection paths being completed over one of a plurality of junctor circuits and including call store means associated with said junctor circuits, a storage position of said call store means storing an indication of a next one of said junctor circuits available for seizure, characterized by means for successively establishing connections between said next available junctor circuit and each of said subscriber sets not yet connected to one of said junctor circuits, whereby allocation of the next available junctor circuit is controlled as a function of a state of the subscriber set connected to said next available junctor circuit over its subscriber loop.

11. An arrangement as claimed in claim 10 wherein said means for successively establishing connections comprises interpreter means for identifying the condition of said next available junctor circuit, said interpreter means cooperating with the call store means which includes means for storing the busy status of each of said subscriber sets as established during each of said successive connections, said interpreter means including means for establishing the connection to said next available junctor circuits upon detection of a loop closed status of one of said subscriber sets, said interpreter means successively establishing said connections to said subscriber sets not marked as busy in said call storage means.

12. An arrangement as claimed in claim 11 wherein said interpreter means comprises means for detecting and storing in said call store means the following subscriber set conditions: loop closed; loop current reduction; and loop open.

13. The switching arrangement as defined in claim 12 wherein said interpreter means further includes means for establishing tone-signal connections to said subscriber set, the connections to said subscriber sets being established as a function of the identified status for the subscriber set receiving the tone signal as received by the interpreter means.

14. The switching arrangement as defined in claim 11 wherein said means for successively establishing connections include said crosspoints comprising two-way thyristors (triacs) that are switched on in accordance with the path established between one of said junctor circuits and one of said subscriber sets, and including a pilot wire defining the through-connection speech path, said pilot wire so controlling said crosspoint thyristors in said through connection path that they can be made conductive both at the onset of the through connection and at every zero-crossing of an alternating current signal applied to the through connection.

15. The arrangement as defined in claim 14, including a switch allocated to each said junctor circuit that opens the pilot wire when a called party answers at said receiving subscriber set.

16. The switching arrangement as defined in claim 14 wherein said call store is allocated to both the incoming and the outgoing side of each connecting device for storing the address of the relevant subscriber set connected to the junctor circuit, whereby after pressing the grounding key of either subscriber set (e.g., to initiate a consultation or a call transfer) the activating crosspoints along the pilot wire are again activated to switch back to the conducting state the crosspoints of the speech wire deenergized by pressing the grounding key.

17. The switching arrangement as defined in claim 14 comprising means for storing an indication of the connection to be established by said pilot wire by marking the subscriber set and the junctor circuit, using a rate effect marking the beginning and ending point of the connection.

18. The arrangement as defined in claim 16 wherein the pilot wire for indicating the subscriber set initially involved in the connection is so connected to said junctor circuit and thereby to said call store to remain energized after said call transfer is initiated to allow the original connection to be reestablished if the connection to be taken over is not connected to the relevant outgoing subscriber set.

19. The switching arrangement as defined in claim 10, including a marking circuit means for utilizing the rate effect to establish connections to said subscriber sets not yet connected and comprising a pilot wire for connecting the speech path crosspoints placed in a conducting state to establish said connection between connected subscriber set and said next available junctor circuit in a sequential manner, the first and last junctor circuits in the connection sequence being indicated.

20. The switching arrangement as defined in claim 19, including first scanner means (VSK) for the activation of the next available junctor circuit and second scanner means for the gradual activation of each of said unconnected subscriber sets, whereby during the scanning of the subscriber sets the state of the crosspoints of said pilot wire can be established in accordance with said rate effect between the connected subscriber set and the junctor circuit.

* * * * *